United States Patent
Liu et al.

(10) Patent No.: US 11,692,830 B2
(45) Date of Patent: Jul. 4, 2023

(54) REAL-TIME LOCALIZATION ERROR CORRECTION OF AUTONOMOUS VEHICLE

(71) Applicant: Intel Corporation, Santa Clara, CA (US)

(72) Inventors: Xiaolong Liu, Beijing (CN); Zhigang Wang, Beijing (CN); Dawei Wang, Beijing (CN); Haitao Ji, Beijing (CN); Qianying Zhu, Beijing (CN); Fei Li, Beijing (CN); Ignacio J Alvarez, Portland, OR (US)

(73) Assignee: Intel Corporation, Santa Clara, CA (US)

(*) Notice: Subject to any disclaimer, the term of this patent is extended or adjusted under 35 U.S.C. 154(b) by 493 days.

(21) Appl. No.: 16/831,104

(22) Filed: Mar. 26, 2020

(65) Prior Publication Data

US 2021/0302168 A1    Sep. 30, 2021

(51) Int. Cl.
  *G01C 21/30* (2006.01)
  *G06K 9/00* (2022.01)
  *G01C 21/36* (2006.01)
  *G06V 20/56* (2022.01)

(52) U.S. Cl.
  CPC ......... *G01C 21/30* (2013.01); *G01C 21/3602* (2013.01); *G06V 20/588* (2022.01)

(58) Field of Classification Search
  CPC ... G01C 21/30; G01C 21/3602; G06V 20/588
  See application file for complete search history.

(56) References Cited

U.S. PATENT DOCUMENTS

| 9,665,100 | B2 | 5/2017 | Shashua et al. |
| 2015/0253141 | A1 | 9/2015 | Kesting et al. |
| 2016/0203373 | A1* | 7/2016 | Menashe ............ G06T 7/74 |
|  |  |  | 382/104 |
| 2018/0165831 | A1* | 6/2018 | Kwant ............ G01C 21/165 |
| 2019/0003847 | A1 | 1/2019 | Song et al. |

FOREIGN PATENT DOCUMENTS

| EP | 3333803 A1 | 6/2018 |
| JP | 2005030889 A * | 2/2005 |

OTHER PUBLICATIONS

Google Translation of JP-2005030889-A (Year: 2005).*

(Continued)

*Primary Examiner* — Rachid Bendidi
*Assistant Examiner* — Sahar Motazedi
(74) *Attorney, Agent, or Firm* — East IP P.C.

(57) ABSTRACT

The present disclosure relates to real-time localization error correction of an autonomous vehicle (AV). A processor for real-time localization error correction of the AV is provided. The processor is configured to retrieve a reference landmark around the AV from a map aggregating server (MAS), wherein the AV is configured to interact with the MAS for real-time localization; detect, in real time, a ground truth landmark corresponding to the reference landmark, according to image data captured by one or more image capture devices installed on the AV; and determine a deviation between the ground truth landmark and the reference landmark as a real-time correction value for the real-time localization of the AV.

16 Claims, 10 Drawing Sheets

(56) References Cited

OTHER PUBLICATIONS

The extended European search report for EP Application No. 20213278.3, dated Jun. 7, 2021, 9 pages.
Cui Dixiao et al. "Real-Time Global Localization of Robotic Cars in Lane Level via Lane Marking Detection and Shape Registration", IEEE Transactions on Intelligent Transportation Systems, vol. 17, No. 4, dated Apr. 1, 2016, 12 Pages.
The Examination report dated Jul. 29, 2022 for European application No. 20213278.3, 4 pages.

* cited by examiner

REAL-TIME LOCALIZATION ERROR CORRECTION OF AUTONOMOUS VEHICLE

FIELD

Embodiments of the present disclosure generally relate to the field of autonomous driving, and in particular to real-time localization error correction of an autonomous vehicle (AV).

BACKGROUND ART

In the field of autonomous driving, high precision localization is a critical issue. In order to navigate to a destination, the AV may need to identify its location within a particular road segment. The AV may use landmarks whose world coordinates are known to perform localization. The idea is to construct a very detailed map (e.g. a high definition (HD) map) that contains various types of landmarks. The assumption is that the AV is equipped with sensing or image capture devices that can detect and locate the landmarks in its own reference frame. Once the relative position between the vehicle and the landmarks is found, the landmarks' world coordinates are taken from the map database, and the AV can use them to compute its location.

SUMMARY

In an aspect, a processor for real-time localization error correction of an AV is provided. The processor is configured to retrieve a reference landmark around the AV from a map aggregating server (MAS), wherein the AV is configured to interact with the MAS for real-time localization; detect, in real time, a ground truth landmark corresponding to the reference landmark, according to image data captured by one or more image capture devices installed on the AV; and determine a deviation between the ground truth landmark and the reference landmark as a real-time correction value for the real-time localization of the AV.

In another aspect, an AV is provided. The AV includes one or more image capture devices and the above described processor for real-time localization error correction of the AV, and the AV is configured to interact with the MAS for the real-time localization based on the determined real-time correction value.

In another aspect, a method for real-time localization error correction of an AV is provided. The method includes: retrieving a reference landmark around the AV from a MAS, wherein the AV is configured to interact with the MAS for real-time localization; detecting, in real time, a ground truth landmark corresponding to the reference landmark, according to image data captured by one or more image capture devices installed on the AV; and determining a deviation between the ground truth landmark and the reference landmark as a real-time correction value for the real-time localization of the AV.

In another aspect, a non-transitory computer-readable medium is provided. The computer-readable medium includes instructions stored thereon. The instructions, when executed by a processor of an AV, cause the processor to perform the above described method for real-time localization error correction of the AV.

In yet another aspect, a MAS to facilitate real-time localization of an AV is provided. The MAS is configured to: store a database of reference landmarks; receive, from the AV, a real-time correction value for the real-time localization, wherein the real-time correction value is associated with a road segment where the AV is travelling, and the real-time correction value is a deviation between a ground truth landmark on the road segment detected by the AV in real time and a corresponding reference landmark retrieved by the AV from the MAS; and determine the real-time correction value as a reference correction value for real-time localization of AVs travelling on the road segment.

BRIEF DESCRIPTION OF THE DRAWINGS

Embodiments of the disclosure will be illustrated, by way of example and not limitation, in the figures of the accompanying drawings in which like reference numerals refer to similar elements.

DETAILED DESCRIPTION OF EMBODIMENTS

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

System Overview

Figure 1:
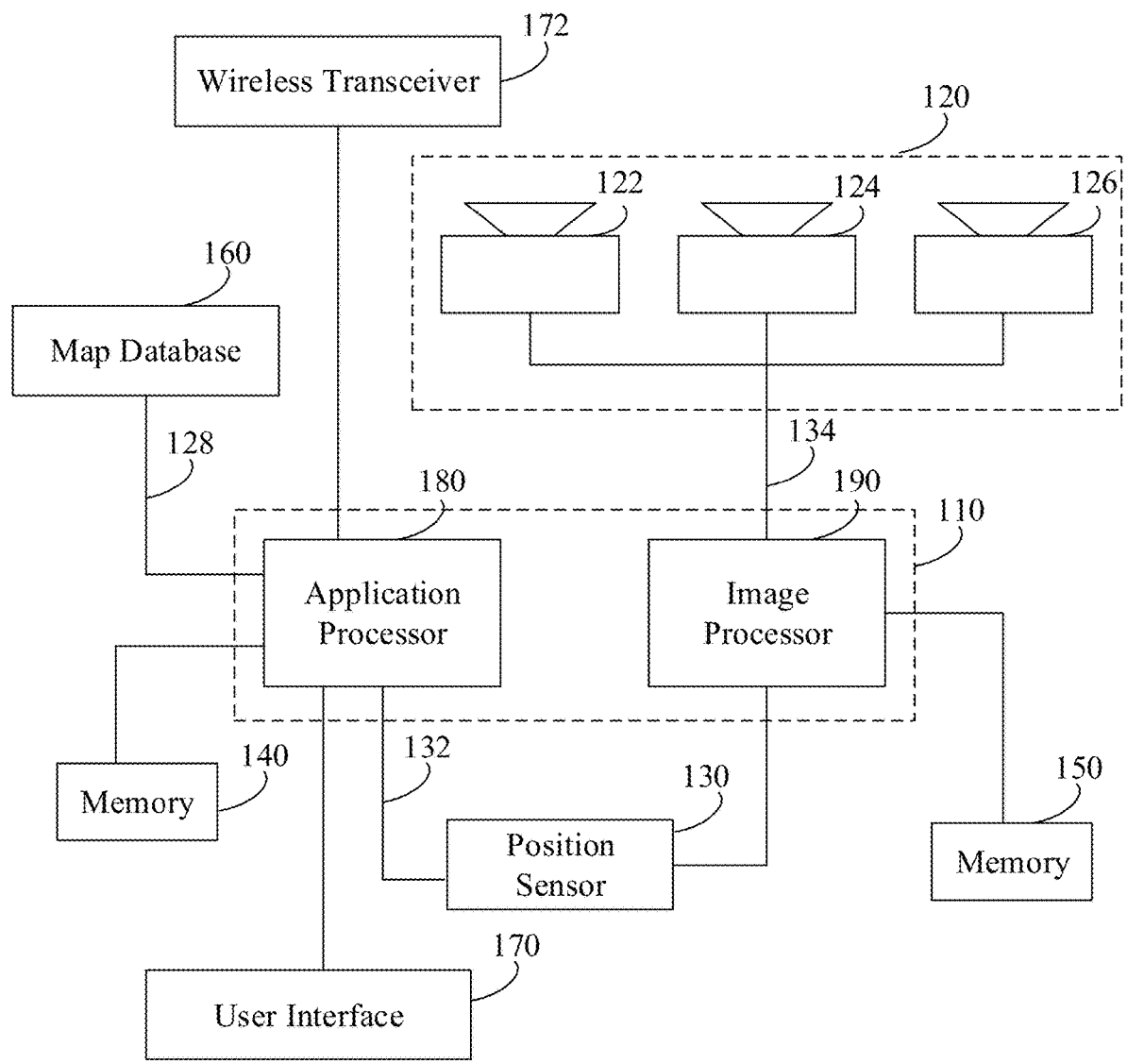
FIG. 1 is a block diagram representation of an exemplary system according to various embodiments of the disclosure.

FIG. 1 is a block diagram representation of an exemplary system according to various embodiments of the disclosure. System 100 may include various components depending on the requirements of a particular implementation. In some embodiments, the system 100 may include a processing unit 110, an image acquisition unit 120, a position sensor 130, one or more memory units 140, 150, a map database 160, a user interface 170, and a wireless transceiver 172. The processing unit 110 may include one or more processing devices. In some embodiments, the processing unit 110 may include an application processor 180, an image processor 190, or any other suitable processing device. Similarly, the image acquisition unit 120 may include any number of image acquisition devices and components depending on the requirements of a particular application. In some embodiments, the image acquisition unit 120 may include one or more image capture devices (e.g., cameras), such as an image capture device 122, an image capture device 124, and an image capture device 126. The system 100 may also include a data interface 128 communicatively connecting the processing unit 110 to the image acquisition unit 120. For example, the data interface 128 may include any wired and/or wireless link or links for transmitting image data acquired by the image acquisition unit 120 to the processing unit 110.

A wireless transceiver 172 may include one or more devices configured to exchange transmissions over an air interface to one or more networks (e.g., cellular, the Internet, etc.) by use of a radio frequency, infrared frequency, magnetic field, or an electric field. The wireless transceiver 172 may use any known standard to transmit and/or receive data (e.g., Wi-Fi, Bluetooth®, Bluetooth Smart, 802.15.4, ZigBee, etc.).

Both the application processor 180 and the image processor 190 may include various types of processing devices. For example, either or both of the application processor 180 and the image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, the application processor 180 and/or the image processor 190 may include any type of single or multi-core processor, mobile device microcontroller, central processing unit, etc. Various processing devices may be used, and may include various architectures.

In some embodiments, the application processor 180 and/or the image processor 190 may include some types of processor designs. These processor designs each include multiple processing units with local memory and instruction sets. Such processors may include video inputs for receiving image data from multiple image sensors and may also include video output capabilities. In one example, the processor uses 90 nm-micron technology operating at 332 Mhz.

The processor architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. One MIPS34K CPU manages the five VCEs, three VMP™ and the DMA, the other MIPS34K CPU and the multi-channel DMA as well as the other peripherals. The five VCEs, three VMP® and the MIPS34K CPU can perform intensive vision computations required by multi-function bundle applications.

Any of the processing devices disclosed herein may be configured to perform certain functions. Configuring a processing device, such as any of the described processors or other controller or microprocessor, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation.

While FIG. 1 depicts two separate processing devices included in processing unit 110, more or fewer processing devices may be used. For example, in some embodiments, a single processing device may be used to accomplish the tasks of the application processor 180 and the image processor 190. In other embodiments, these tasks may be performed by more than two processing devices. Further, in some embodiments, the system 100 may include one or more processing units 110 without including other components, such as the image acquisition unit 120.

The processing unit 110 may comprise various types of devices. For example, the processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., the application processor 180 and/or the image processor 190), may control operations of various aspects of the system 100. These memory units may include various databases and image processing software. The memory units may include random access memory, read only memory, flash memory, disk drives, optical storage, tape storage, removable storage and/or any other types of storage. In some embodiments, memory units 140, 150 may be separate from the application processor 180 and/or the image processor 190. In other embodiments, these memory units may be integrated into the application processor 180 and/or the image processor 190.

The position sensor 130 may include any type of device suitable for determining a location associated with at least one component of the system 100. In some embodiments, the position sensor 130 may include a GPS receiver. Such receivers can determine a user position and velocity by processing signals broadcasted by global positioning system satellites. Position information from the position sensor may be made available to the application processor 180 and/or the image processor 190.

In some embodiments, the system 100 may include components such as a speed sensor (e.g., a tachometer) for measuring a speed of a vehicle and/or an accelerometer (not shown) for measuring an acceleration of the vehicle.

User interface 170 may include any device suitable for providing information to or for receiving inputs from one or more users of the system 100. In some embodiments, the user interface 170 may include user input devices, including, for example, a touchscreen, microphone, keyboard, pointer devices, track wheels, cameras, knobs, buttons, etc. With such input devices, a user may be able to provide information inputs or commands to the system 100 by typing instructions or information, providing voice commands, selecting menu options on a screen using buttons, pointers, or eye-tracking capabilities, or through any other suitable techniques for communicating information to the system 100.

User interface 170 may be equipped with one or more processing devices configured to provide and receive information to or from a user and process that information for use by, for example, the application processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, the user interface 170 may include a display, a speaker, a tactile device, and/or any other devices for providing output information to a user.

Map database 160 may include any type of database for storing map data useful to the system 100. In some embodiments, the map database 160 may include data relating to the position, in a reference coordinate system, of various items, including roads, water features, geographic features, businesses, points of interest, restaurants, gas stations, etc. The map database 160 may store not only the locations of such items, but also descriptors relating to those items, including, for example, names associated with any of the stored features. In some embodiments, the map database 160 may be physically located with other components of the system 100. Alternatively or additionally, the map database 160 or a portion thereof may be located remotely with respect to other components of the system 100 (e.g., the processing unit 110). In such embodiments, information from the map database 160 may be downloaded over a wired or wireless data connection to a network (e.g., over a cellular network and/or the Internet, etc.).

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices.

Figure 2:
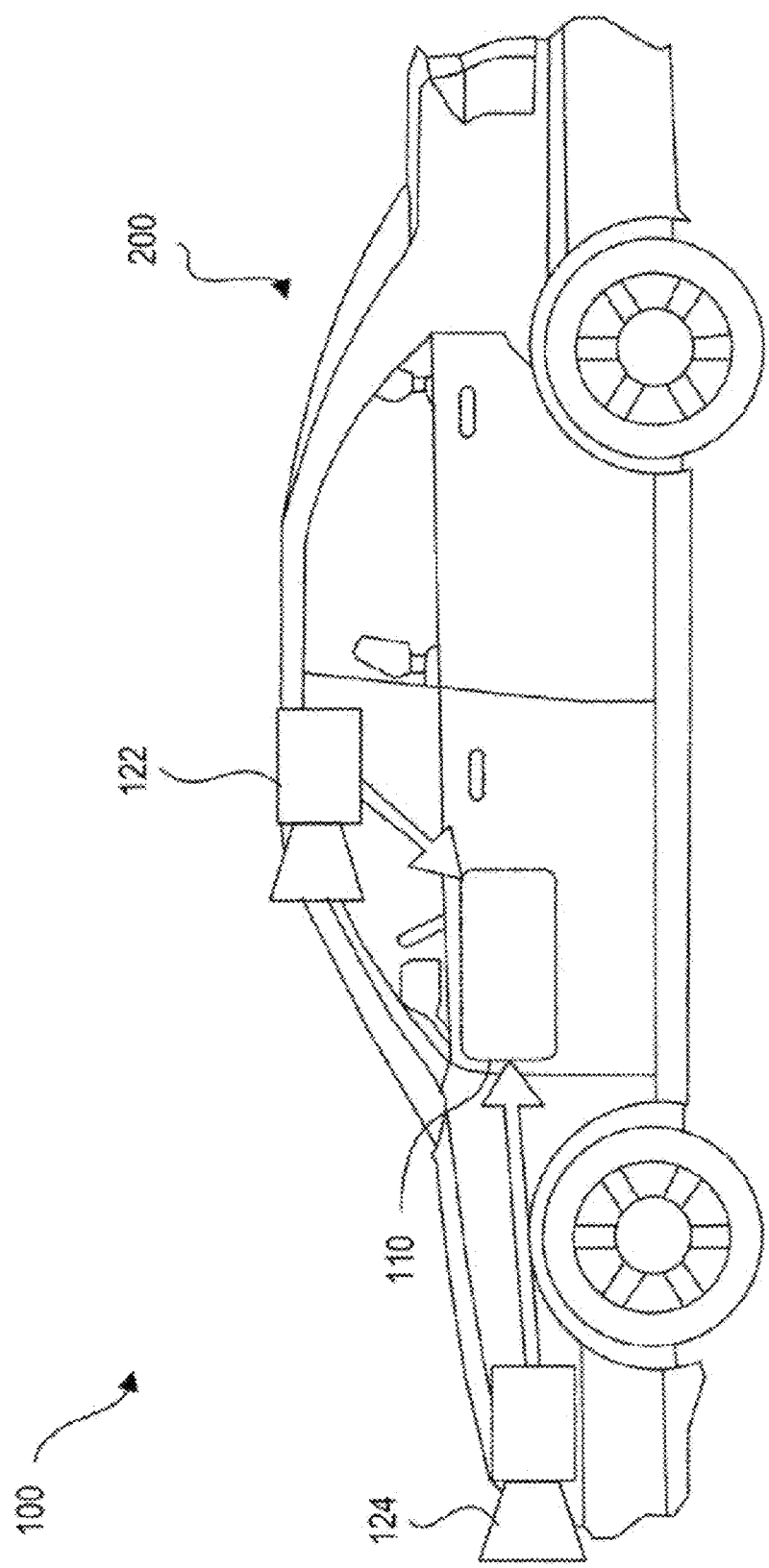
FIG. 2 is a diagrammatic side view representation of an exemplary autonomous vehicle (AV) including a system according to various embodiments of the disclosure.

The system 100, or various components thereof, may be incorporated into various different platforms. In some embodiments, the system 100 may be included on a vehicle 200 (e.g. an autonomous vehicle), as shown in FIG. 2. For example, the vehicle 200 may be equipped with the processing unit 110 and any of the other components of the system 100, as described above relative to FIG. 1. While in some embodiments the vehicle 200 may be equipped with only a single image capture device (e.g., camera), in other embodiments, multiple image capture devices may be used. For example, any of the image capture devices 122 and 124 of the vehicle 200, as shown in FIG. 2, may be part of an ADAS (Advanced Driver Assistance Systems) imaging set.

The image capture devices included on the vehicle 200 as part of the image acquisition unit 120 may be positioned at any suitable location. In some embodiments, as shown in FIG. 2, the image capture device 122 may be located in the vicinity of the rearview mirror. This position may provide a line of sight similar to that of the driver of the vehicle 200, which may aid in determining what is and is not visible to the driver. The image capture device 122 may be positioned at any location near the rearview mirror, but placing the image capture device 122 on the driver side of the mirror may further aid in obtaining images representative of the driver's field of view and/or line of sight.

Other locations for the image capture devices of the image acquisition unit 120 may also be used. For example, the image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of the vehicle 200, on the roof of the vehicle 200, on the hood of the vehicle 200, on the trunk of the vehicle 200, on the sides of the vehicle 200, mounted on, positioned behind, or positioned in front of any of the windows of the vehicle 200, and mounted in or near light fixtures on the front and/or back of the vehicle 200, etc.

In addition to image capture devices, the vehicle 200 may include various other components of system 100. For example, the processing unit 110 may be included on the vehicle 200 either integrated with or separate from an engine control unit (ECU) of the vehicle. The vehicle 200 may also be equipped with the position sensor 130 such as a GPS receiver, and may also include the map database 160 and the memory units 140 and 150.

As discussed earlier, the wireless transceiver 172 may transmit and/or receive data over one or more networks (e.g., cellular networks, the Internet, etc.). For example, the wireless transceiver 172 may upload data collected by the system 100 to one or more servers, and download data from the one or more servers. Via the wireless transceiver 172, the system 100 may receive, for example, periodic or on-demand or real-time updates to data stored in the map database 160, the memory 140, and/or the memory 150. Similarly, the wireless transceiver 172 may upload any data (e.g., images captured by image acquisition unit 120, data received by one or more sensors in the sensor unit 130, vehicle control systems, etc.)

from the system 100 and/or any data processed by processing unit 110 to the one or more servers.

The system 100 may upload data to a server (e.g. to the cloud) based on a privacy level setting to regulate or limit the types of data (including metadata) sent to the server that may uniquely identify a vehicle and/or driver/owner of a vehicle. Such settings may be set by user via, for example, wireless transceiver 172, be initialized by factory default settings, or by data received by wireless transceiver 172.

In addition, for more details about the components of the system 100 and their possible implementations in the vehicle 200, references may be made to a U.S. Pat. No. 9,665,100 B2 issued on May 30, 2017 and titled "SPARSE MAP FOR AUTONOMOUS VEHICLE NAVIGATION", which is incorporated herein by reference in its entirety.

According to embodiments of the disclosure, the system 100 may be included on an autonomous vehicle (AV), and the processor and method for real-time localization error correction as proposed may be used on the AV.

In the field of autonomous driving, high precision localization is a critical issue. In order to navigate to a destination, the AV may need to identify its location within a particular road segment. The AV may use landmarks whose world coordinates are known to perform localization. The idea is to construct a HD map that contains various types of landmarks. The assumption is that the AV is equipped with sensing or image capture devices that can detect and locate the landmarks in its own reference frame. Once the relative position between the vehicle and the landmarks is found, the landmarks' world coordinates may be taken from the map database, and the AV can use them to compute its location. Based on the idea, a HD map experience management system (HDMEMS) is proposed to allow AVs to implement high precision localization.

For better understanding the embodiments of the present application, the overview of the AV and the HDMEMS will be discussed below. Meanwhile, it should be noted that the HDMEMS will be only taken as an example map experience management system to explain the principles of the embodiments of the present application, but various types of map experience management systems currently available or to be developed in the future may be applied to implement various embodiments of the present application.

Autonomous Vehicle Overview

As used throughout this disclosure, the term "autonomous vehicle (AV)" refers to a vehicle capable of implementing at least one navigational change without driver input. A "navigational change" refers to a change in one or more of steering, braking, or acceleration of the vehicle. To be autonomous, a vehicle needs not be fully automatic (e.g., fully operation without a driver or without driver input). Rather, an AV includes those that can operate under driver control during certain time periods and without driver control during other time periods. AVs may also include vehicles that control only some aspects of vehicle navigation, such as steering (e.g., to maintain a vehicle course between vehicle lane constraints), but may leave other aspects to the driver (e.g., braking). In some cases, AVs may handle some or all aspects of braking, speed control, and/or steering of the vehicle.

As human drivers typically rely on visual cues and observations in order to control a vehicle, transportation infrastructures are built accordingly, with lane markings, traffic signs, and traffic lights all designed to provide visual information to drivers. In view of these design characteristics of transportation infrastructures, an AV may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an AV may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while it is traveling, and the vehicle (as well as other vehicles) may use the information to localize itself on the model.

HD Map Experience Management System Overview

The need for a HD map to enable fully autonomous driving stems from the fact that functional safety standards require back-up sensors—"redundancy"— for all elements of the chain from sensing to actuation. Although other sensors such as radar and LiDAR may provide redundancy for object detection, the camera is the only real-time sensor for driving path geometry and other static scene semantics (such as traffic signs, on-road markings, etc.). Therefore, for path sensing and foresight purposes, a HD map can serve as the source of redundancy. Also, in order for the map to be a reliable source of redundancy, it must be updated with an ultra-high refresh rate to secure its low Time to Reflect Reality (TTRR) qualities.

To address these challenges, a HD map experience management system (HDMEMS) may be constructed by exploiting the proliferation of camera-based ADAS systems to build and maintain in near-real-time an accurate map of the real environment. The HDMEMS can operate as an end-to-end mapping and localization engine for full autonomy.

Figure 3:
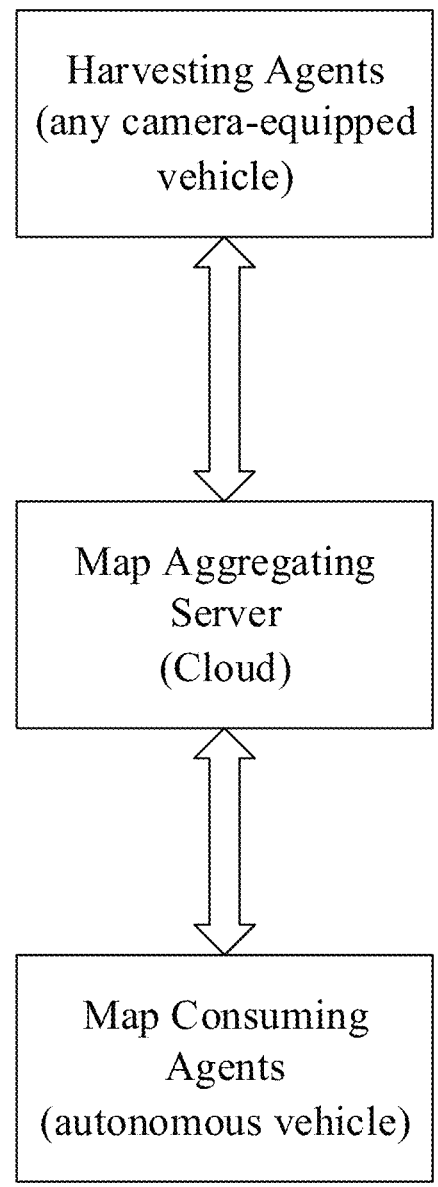
FIG. 3 schematically illustrates an exemplary HD map experience management system (HDMEMS) that can be used for real-time localization of an AV, according to various embodiments of the disclosure.

FIG. 3 schematically illustrates an exemplary HDMEMS that can be used for real-time localization of an AV, according to various embodiments of the disclosure. As shown, the system may involve three layers: harvesting agents (any camera-equipped vehicles), a map aggregating server (cloud), and map-consuming agents (autonomous vehicles).

The harvesting agents may be any camera-equipped vehicles. The camera-equipped vehicle may collect, via cameras, data about a driving path's geometry and stationary landmarks around the vehicle, implement real-time geometrical and semantic analysis for the collected data, compress the map-relevant data into small capsules (e.g. called Road Segment Data (RSD)), and then sent the RSDs to the map aggregating server.

The map aggregating server may be a cloud server that aggregates and reconciles the continuous stream of RSDs to construct a highly accurate and low TTRR map. Such a map may be regarded as a HD map and also called a "Roadbook" herein.

Then the HD map stored in the map aggregating server may be used by a map consuming agent (e.g. an AV) for real-time localization. The AV may interact with the cloud server to automatically localize itself within the Roadbook by real-time detection of landmarks stored in the Roadbook.

Various types of landmarks may assist the AV to perform real-time localization. Landmarks may be classified into two categories: landmarks that are directly relevant to driving, and landmarks that are not directly relevant to driving. For example, the landmarks directly relevant to driving may include traffic signs, arrows on the road, lane markings, traffic lights, stop lines, etc. Also for example, the landmarks not directly relevant to driving may include lampposts, directional signs, business signs, or billboards.

In most situations, the HDMEMS may operate properly for the real-time localization of an AV because the landmarks in the Roadbook come from images captured by cameras and are usually updated with an ultra-high refresh rate. Especially for an AV travelling on a road segment containing a large number of landmarks stored in the Roadbook, the AV can usually localize itself with a high accuracy by detecting the landmarks.

However, at some road segments, there may be only a few landmarks, or the landmarks may be very small, or the landmarks may be not clear due to poor illumination. In such situations, the landmarks relevant to the road segments stored in the Roadbook may be deviated from the real landmarks, and thus the localization based on the landmarks in the Roadbook may be not accurate. Also, it is noted that the Roadbook is actually not updated in real time, although it is updated with an ultra-high refresh rate.

In view of these issues, it is proposed in the present disclosure to implement real-time localization error correction using the map consuming agents (e.g. map consuming AVs). The process of real-time localization error correction using the AVs according to embodiments of the present disclosure will be described in detail below with reference to FIG. 4 to FIG. 9.

Figure 4:
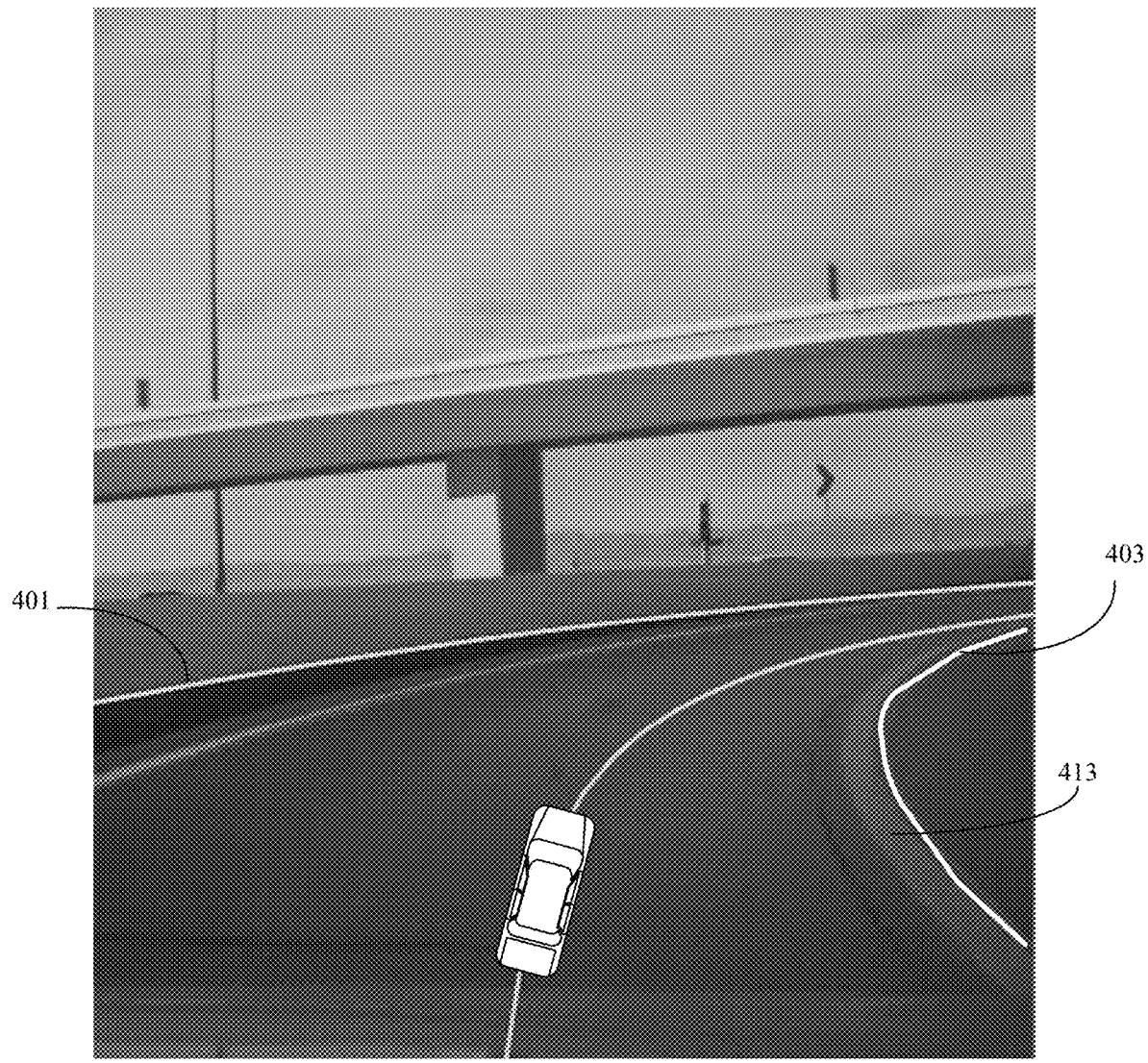
FIG. 4 illustrates an exemplary road segment where an AV is travelling according to various embodiments of the disclosure.

FIG. 4 illustrates an exemplary road segment where an AV is travelling according to various embodiments of the disclosure. For example, the road segment may be a segment of an interstate highway and only have very few landmarks. For such a road segment, the landmarks stored in the Roadbook may be deviated from corresponding landmarks detected by the AV in real time. Only for purpose of illustration, the line 401 and the line 403 respectively indicate the road edge and a lane boundary stored in the Roadbook, and the real lane boundary corresponding to the lane boundary 403 stored in the Roadbook is represented by the line 413. As shown in FIG. 4, the reference landmark 403 is deviated from the real landmark 413. Actually, on such a road segment, other reference landmarks may also be deviated from the real landmarks.

For convenience of description, a landmark stored in the Roadbook may be referred to as a reference landmark and a landmark detected by the AV in real time may be referred to as a ground truth landmark hereinafter. Compared to the reference landmark, the corresponding ground truth landmark is usually deemed closer to the real landmark, because the ground truth landmark is a result of real-time detection while the reference landmark may be not updated in real time.

Figure 5:
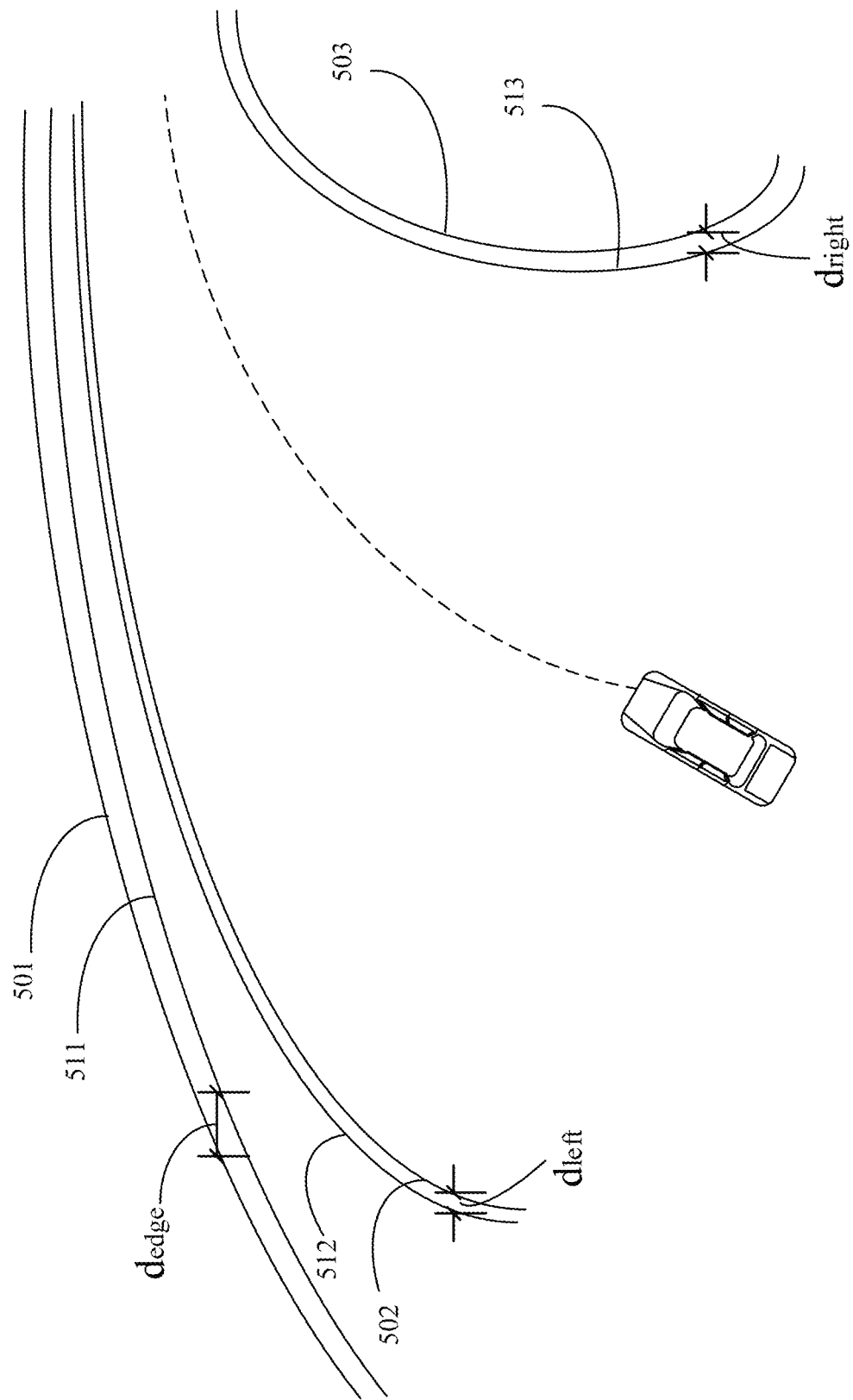
FIG. 5 schematically illustrates example reference landmarks from a HD map aggregating server (HDMAS) and corresponding ground truth landmarks detected by an AV in real time for the exemplary road segment of FIG. 4, according to various embodiments of the disclosure.

FIG. 5 schematically illustrates example reference landmarks from a HD map aggregating server and corresponding ground truth landmarks detected by an AV in real time for the example road segment of FIG. 4, according to various embodiments of the disclosure.

In FIG. 5, three reference landmarks for the road segment retrieved from the map aggregating server are illustrated as an example, including a road edge 501, a left boundary 502 of a lane and a right boundary 503 of the lane. When the AV is travelling on the road segment, the AV may detect the landmarks corresponding to the reference landmarks to perform real-time localization. As illustrated, the real-time detected landmarks may be deviated from the reference landmarks. Specifically, the deviation between the real-time detected road edge 511 and the reference road edge 501 is denoted by $d_{edge}$, the deviation between the real-time detected left lane boundary 512 and the reference left lane boundary 502 is denoted by $d_{left}$, and the deviation between the real-time detected right lane boundary 513 and the reference right lane boundary 503 is denoted by $d_{right}$.

Generally, the real-time detected landmarks are more trustworthy than the reference landmarks stored in the map aggregating server since the reference landmarks are collected by harvest vehicles and may not be updated in real time. Thus, it is proposed to implement real-time localization error correction by calculating the deviation between the reference landmark and the real-time detected landmark and using the deviation as a real-time correction value for the real-time localization of the AV.

The deviations $d_{edge}$, $d_{left}$ and $d_{right}$ in FIG. 5 are illustrated in the image plane. In order to calculate the deviations between the reference landmarks and the real-time detected landmarks in the real-word plane, a projection of the detected road segment from the image plane onto the real-word plane may be needed. The projection may be characterized using a perspective project matrix having elements corresponding to physical properties such as the position, slope, curvature, and curvature derivative of the detected road segment.

Figure 6:
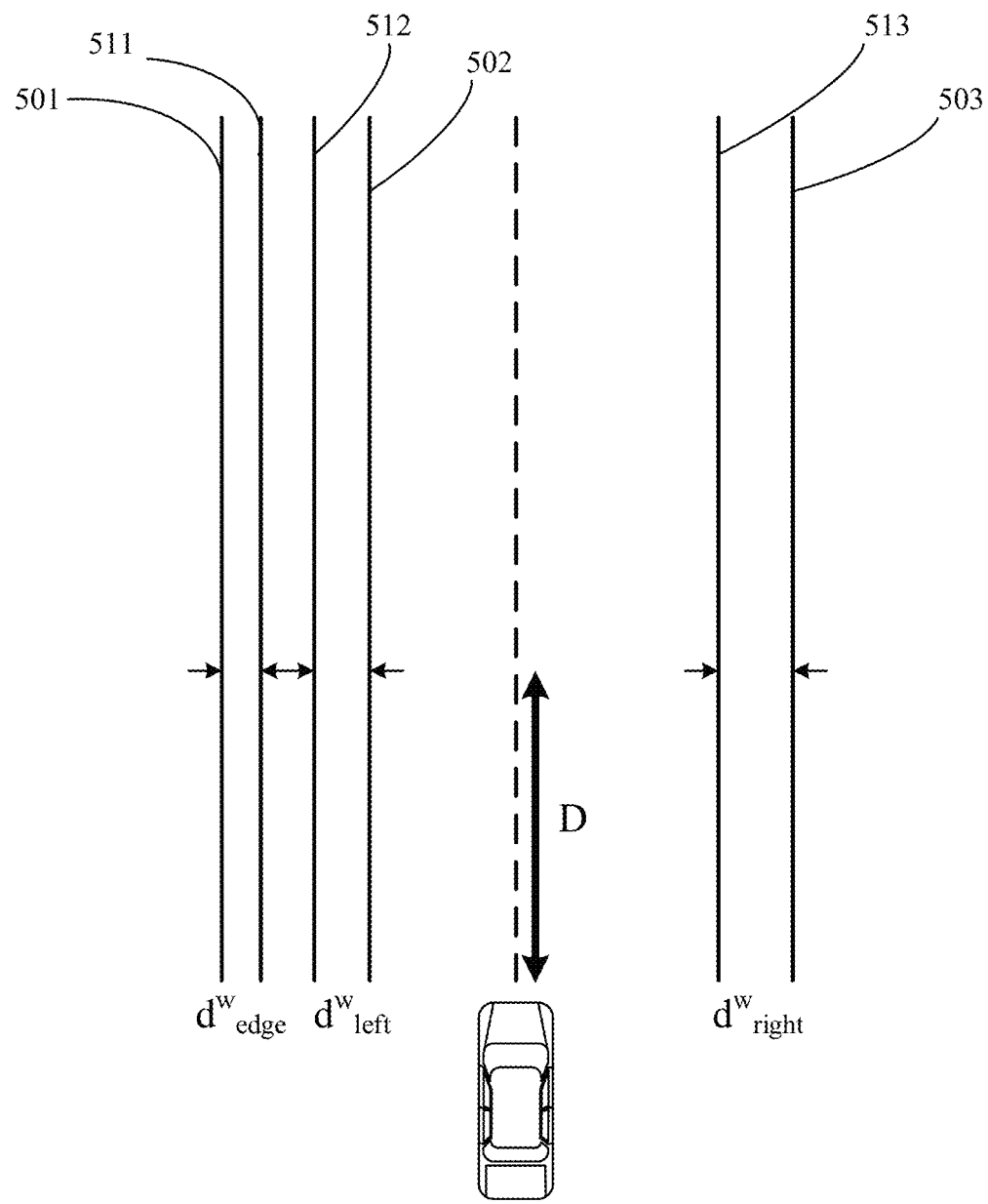
FIG. 6 schematically illustrates the example reference landmarks and the ground truth landmarks of FIG. 5 projected from the image plane onto the real-world plane, according to various embodiments of the disclosure.

FIG. 6 schematically illustrates the example reference landmarks and ground truth landmarks of FIG. 5 projected from the image plane onto the real-world plane, according to various embodiments of the disclosure.

As shown in FIG. 6, the points at the distance D in front of the AV may be referenced to calculate the deviations $d^w_{edge}$, $d^w_{left}$ and $d^w_{right}$ along the vertical direction of the road segment. According to embodiments of the present disclosure, any of the deviations $d^w_{edge}$, $d^w_{left}$ and $d^w_{right}$ may be used by the AV as the real-time correction value for the real-time localization.

In some embodiments, it may be advantageous to calculate an average value of the deviations $d^w_{edge}$, $d^w_{left}$ and $d^w_{right}$ as the real-time correction value for the real-time localization. That is, an average deviation $d_w = (d^w_{right} + d^w_{left} + d^w_{edge})/N$ may be calculated as the real-time correction value. Here, the number N depends on the number of landmarks to be detected for the localization error correction. In the exemplary embodiment, three landmarks including the road edge and two boundaries of the lane are detected, so the number N is 3. Actually, the AV may detect more landmarks to calculate an average real-time correction value so as to implement the localization error correction more accurately.

On basis of the above illustrated idea about the real-time localization error correction using the map consuming AVs, some exemplary processes for real-time localization error correction at the map consuming AVs will be described in detail below.

Figure 7:
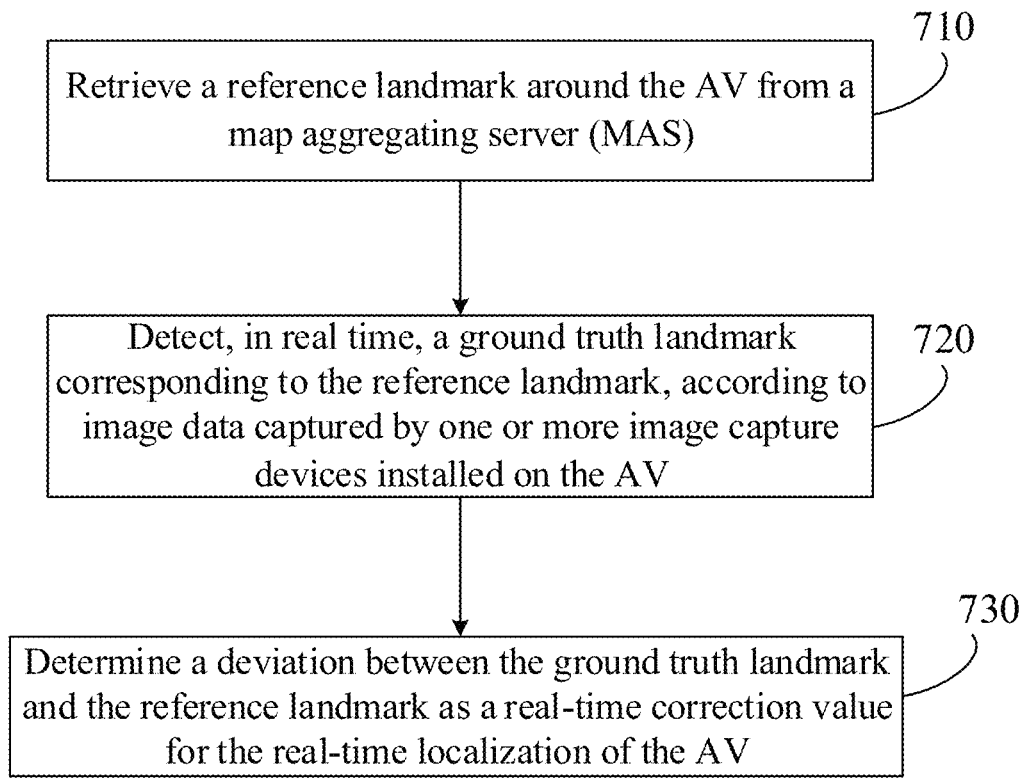
FIG. 7 illustrates a flow chart of an exemplary process for real-time localization error correction at an AV according to various embodiments of the disclosure.

FIG. 7 illustrates a flow chart of an exemplary process for real-time localization error correction at a map consuming vehicle (e.g. an AV) according to various embodiments of the disclosure.

The exemplary process for real-time localization error correction may be performed by a processor at the AV. For example, the AV may be the AV 200 of FIG. 2 equipped with the system 100 of FIG. 1. The process may include operations 710 to 730.

At 710, the AV may retrieve, a reference landmark around the AV from the map aggregating server (MAS). The MAS may be the map aggregating server in the above described HD map experience management system, and the AV may be the map consuming vehicle. The landmarks stored in the MAS may be referred to as reference landmarks herein. The AV may be configured to interact with the MAS to perform real-time localization based on the reference landmarks.

At 720, the AV may detect, in real time, a ground truth landmark corresponding to the reference landmark, according to image data captured by one or more image capture devices installed on the AV. The real-time detected landmarks may be referred to as ground truth landmarks in order to be differentiated from the reference landmarks stored in the MAS. As illustrated above, the ground truth landmark may be deviated from the corresponding reference landmark, and the deviation may be taken as a real-time correction value for the real-time localization of the AV.

Thus at 730, the AV may determine a deviation between the ground truth landmark and the reference landmark as a real-time correction value for the real-time localization of the AV. The deviation may be calculated in the real-world plane by projecting the relevant road segment from the image plane onto the real-word plane as shown in FIG. 6.

In the embodiment, the deviation between the ground truth landmark and the reference landmark is determined as the real-time correction value for the real-time localization of the AV. In some embodiments of the present disclosure, multiple reference landmarks and corresponding ground truth landmarks may be compared to calculate an average deviation as the real-time correction value so as to increase the accuracy of real-time localization error correction.

Figure 8:
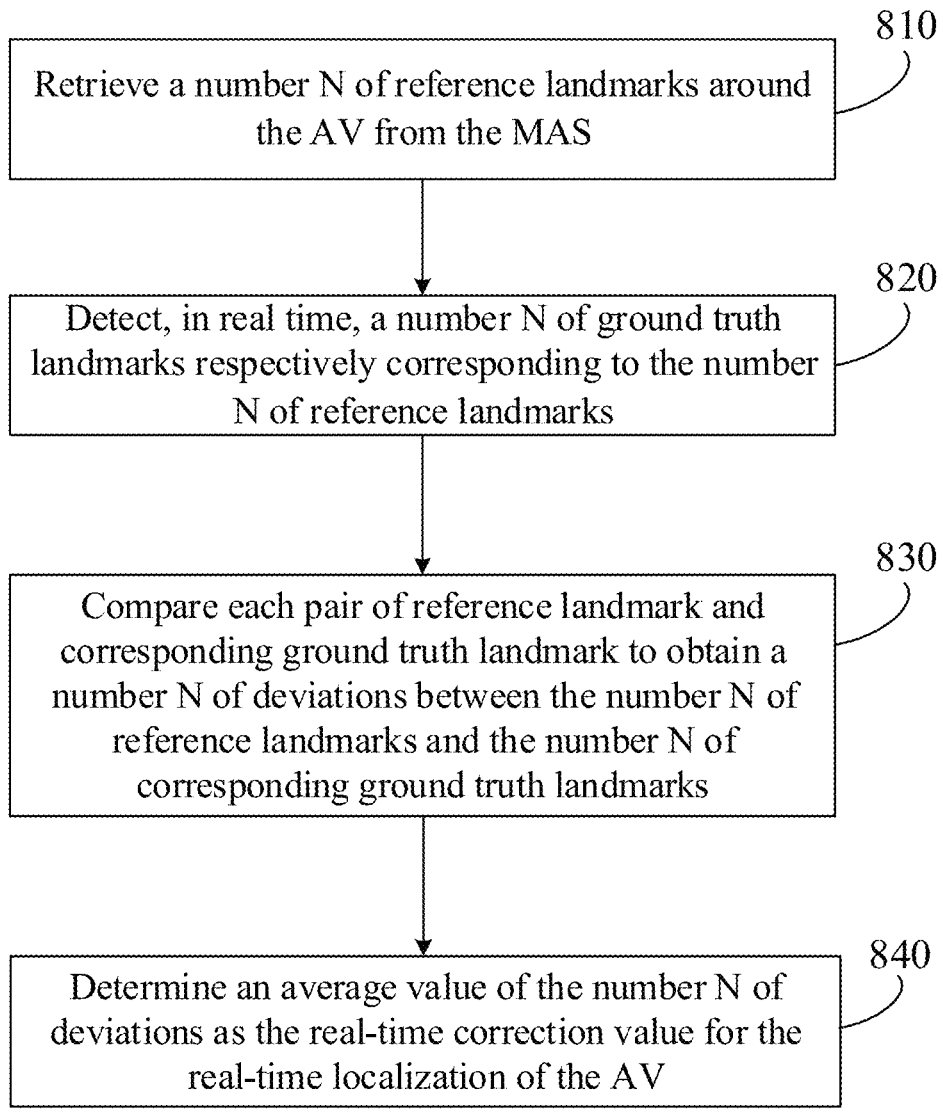
FIG. 8 illustrates a flow chart of an exemplary process for real-time localization error correction at an AV according to various embodiments of the disclosure.

FIG. 8 illustrates a flow chart of an exemplary process for real-time localization error correction at an AV according to various embodiments of the disclosure.

Similar to the process in FIG. 7, the exemplary process in FIG. 8 may also be performed by a processor at the AV. For example, the AV may be the AV 200 of FIG. 2 equipped with the system 100 of FIG. 1. The process may include operations 810 to 840.

At 810, the AV may retrieve, a number N of reference landmarks around the AV from the MAS, where N is an integer greater than 1. For example, as shown in FIG. 5, three reference landmarks including a road edge 501, a left boundary 502 of a lane and a right boundary 503 of the lane are retrieved from the MAS. In some embodiments, more reference landmarks may be retrieved from the MAS. For example, a left boundary and a right boundary of an adjacent lane may be retrieved as additional reference landmarks from the MAS.

At 820, the AV may detect, in real time, a number N of ground truth landmarks respectively corresponding to the number N of reference landmarks. In the example of FIG. 5, three ground truth landmarks including the real-time detected road edge 511, the real-time detected left boundary 512 of the lane and the real-time detected right boundary 513 of the lane are detected by the AV, according to image data captured by one or more image capture devices installed on the AV.

At 830, the AV may compare each pair of reference landmark and corresponding ground truth landmark to obtain a number N of deviations between the number N of reference landmarks and the number N of corresponding ground truth landmarks. In the example as illustrated by FIG. 5 and FIG. 6, three deviations $d^w_{edge}$, $d^w_{left}$ and $D^w_{right}$ along the vertical direction of the road segment are obtained by respectively comparing the reference landmarks and corresponding ground truth landmarks.

At 840, the AV may determine an average value of the number N of deviations as the real-time correction value for the real-time localization of the AV. For example, an average deviation $d^w = (d^w_{right} + d^w_{left} + d^w_{edge})/3$ may be calculated as the real-time correction value for the real-time localization.

In the embodiments of the present disclosure, once the real-time correction value is determined, the AV may use the correction value to correct an error of the real-time localization. Meanwhile, the AV may report the determined real-time correction value to the MAS via a communication interface between the MAS and the AV, so that the correction value may be stored in the MAS as a reference correction value for other AVs to implement the real-time localization error correction when travelling on the same road segment.

In some embodiments, the above described process for real-time localization error correction may be implemented at multiple AVs passing the same road segment. For example, during a predetermined period of time T, a total number M of AVs may pass the road segment as shown in FIG. 4 and FIG. 5, where M is an integer greater than 1. Each AV may calculate a real-time correction value based on the above described process for real-time localization error correction, and report the real-time correction value to the MAS. In this case, a total number M of real-time correction values may be reported to the MAS, and the MAS may calculate an average value of these real-time correction values as the reference correction value for all AVs travelling on the road segment to perform real-time localization error correction.

Therefore, in some embodiments, the AV may directly retrieve the reference correction value from the MAS as the correction value for the real-time localization error correction. In some alternative embodiments, the AV may also perform the above described process to determine a real-time correction value, and calculate an average value of the reference correction value and the real-time correction value as a final real-time correction value for the real-time localization of the AV.

Figure 9:
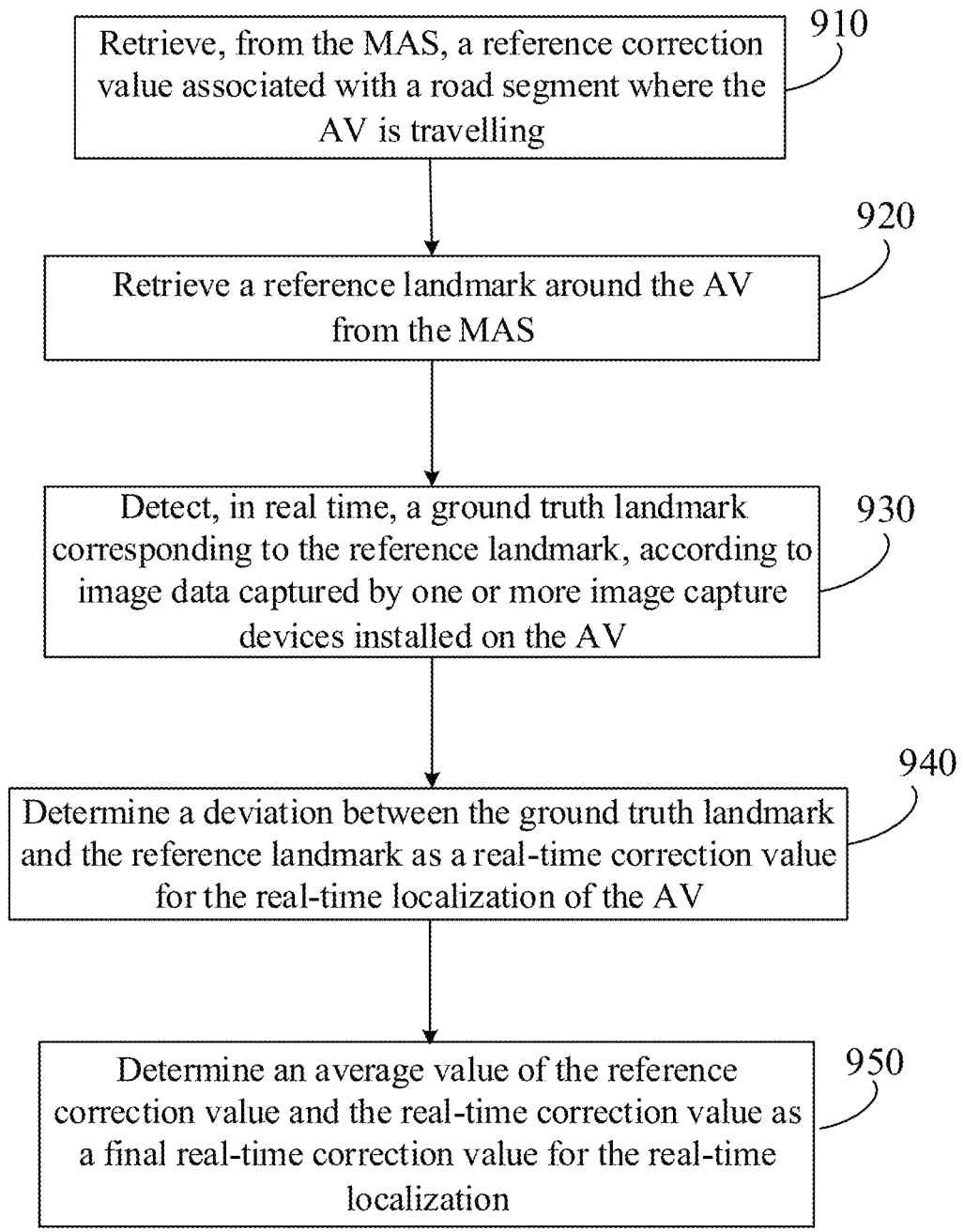
FIG. 9 illustrates a flow chart of an exemplary process for real-time localization error correction at an AV according to various embodiments of the disclosure.

FIG. 9 illustrates a flow chart of an exemplary process for real-time localization error correction at an AV according to various embodiments of the disclosure. The process may include operations 910 to 950, among which the operations 920 to 940 are the same as the operations 710 to 730 of FIG. 7 and thus will not be repeatedly described here.

At 910, the AV may retrieve, from the MAS, a reference correction value associated with the road segment where the AV is travelling. Then, a real-time correction value may be determined by performing the operations 920 to 940. At 950, the AV may determine an average value of the reference correction value and the real-time correction value as a final real-time correction value for the real-time localization. Also, the final real-time correction value may be reported to the MAS.

In the embodiment, the reference correction value may be a real-time correction value reported to the MAS by another AV passing the road segment. Alternatively, the reference correction value may be an average value of a number M of real-time correction values reported respectively by a number M of AVs passing the road segment during a predetermined period of time, where M is an integer greater than 1.

Figure 10:
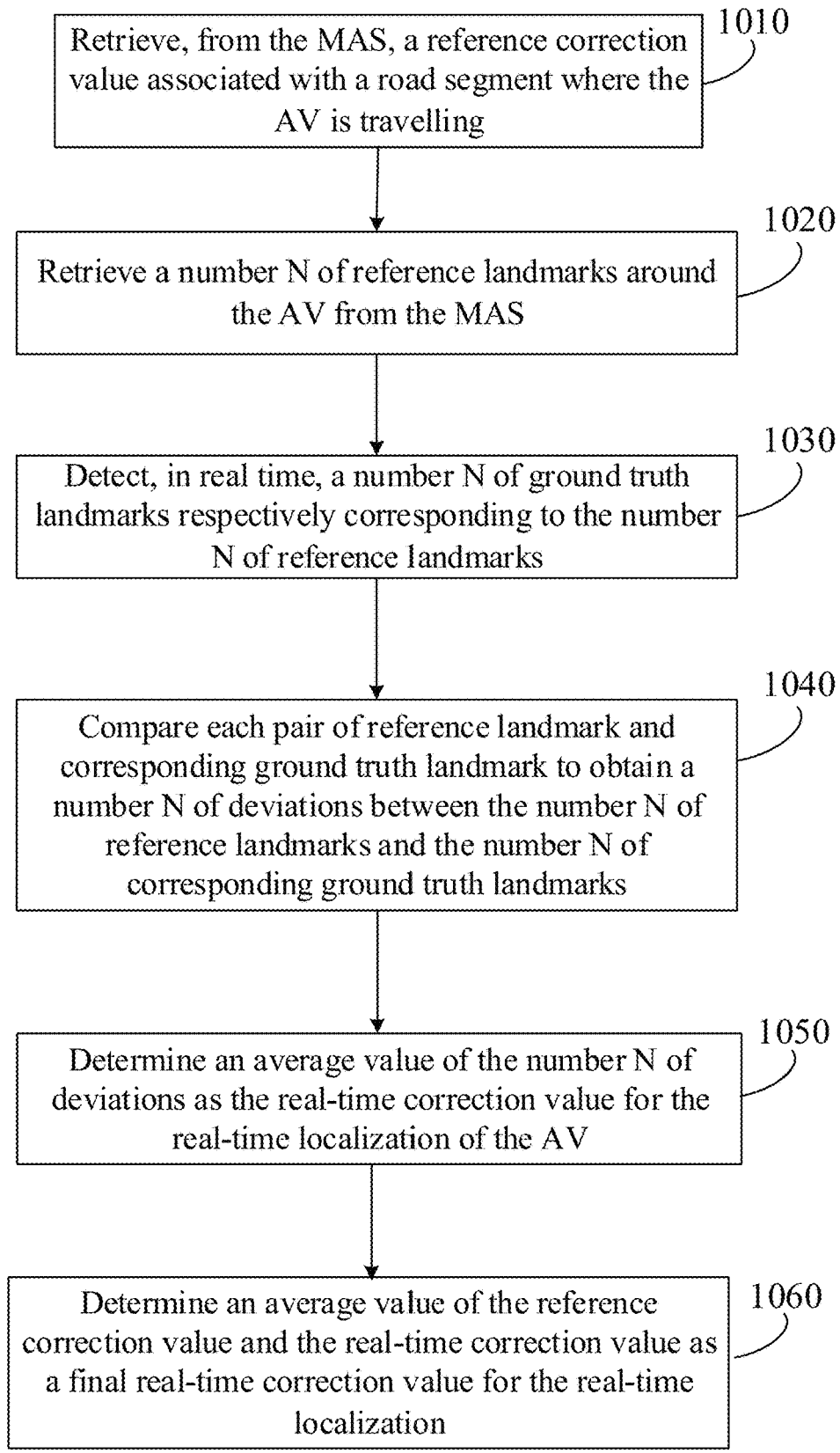
FIG. 10 illustrates a flow chart of an exemplary process for real-time localization error correction at an AV according to various embodiments of the disclosure.

FIG. 10 illustrates a flow chart of an exemplary process for real-time localization error correction at an AV according to various embodiments of the disclosure. The process may include operations 1010 to 1060, among which the operations 1010 and 1060 are the same as the operations 910 and 950 of FIG. 9 and the operations 1020 to 1050 are the same as the operations 710 to 730 of FIG. 7. Thus, the operations in FIG. 10 will not be repeatedly described here.

Similar to the process of FIG. 9, in the process of FIG. 10, the reference correction value may be a real-time correction value reported to the MAS by another AV passing the road segment, or an average value of a number M of real-time correction values reported respectively by a number M of AVs passing the road segment during a predetermined period of time, where M is an integer greater than 1.

In the above embodiments, the exemplary processes for real-time localization error correction to be performed at the AV are illustrated. The AV may be configured to interact with the MAS to implement the real-time localization based on the determined real-time correction value. Accordingly, the MAS may be configured to facilitate real-time localization of the AV. Specifically, the MAS may store a database of reference landmarks. The reference landmarks may come from real image data captured by cameras installed on harvesting vehicles. The reference landmarks may be stored in the MAS and updated with an ultra-high refresh rate.

The MAS may receive, from the AV, a real-time correction value for the real-time localization. The real-time correction value may be associated with a road segment where the AV is travelling. In some embodiments, the real-time correction value may be determined by the AV as a deviation between a ground truth landmark detected by the AV in real time and a corresponding reference landmark retrieved by the AV from the MAS. The MAS may determine the real-time correction value as a reference correction value for real-time localization of AVs travelling on the road segment.

As described above, the AV may be configured to retrieve a number N of reference landmarks around the AV from the MAS; detect, in real time, a number N of ground truth landmarks respectively corresponding to the number N of reference landmarks; compare each pair of reference landmark and corresponding ground truth landmark to obtain a number N of deviations between the number N of reference landmarks and the number N of ground truth landmarks; and calculate an average value of the number N of deviations as the real-time correction value. Therefore, in some embodiments, the real-time correction value received from the AV may be the average value of the number N of deviations determined by the AV.

In some embodiments, the MAS may receive a number M of real-time correction values respectively from a number M of AVs passing the road segment during a predetermined period of time. In this case, the MAS may determine an average value of the number M of real-time correction values as the reference correction value for real-time localization of the AVs travelling on the road segment.

According to the embodiments of the present disclosure, the error of real-time localization of the AV due to the deviations between the reference landmarks and the real landmarks may be corrected by the real-time correction value determined by the AV. Such solutions may be especially advantageous for the real-time localization on the road segments having very few landmarks, small landmarks or obscure landmarks.

The following paragraphs describe examples of various embodiments.

Example 1 includes a processor for real-time localization error correction of an autonomous vehicle (AV), configured to: retrieve a reference landmark around the AV from a map aggregating server (MAS), wherein the AV is configured to interact with the MAS for real-time localization; detect, in real time, a ground truth landmark corresponding to the reference landmark, according to image data captured by one or more image capture devices installed on the AV; and determine a deviation between the ground truth landmark and the reference landmark as a real-time correction value for the real-time localization of the AV.

Example 2 includes the processor according to example 1, further configured to: retrieve a number N of reference landmarks around the AV from the MAS; detect, in real time, a number N of ground truth landmarks respectively corresponding to the number N of reference landmarks; compare each pair of reference landmark and corresponding ground truth landmark to obtain a number N of deviations between the number N of reference landmarks and the number N of corresponding ground truth landmarks; and determine an average value of the number N of deviations as the real-time correction value for the real-time localization of the AV, where N is an integer greater than 1.

Example 3 includes the processor according to example 1 or 2, further configured to: report the real-time correction value to the MAS via a communication interface between the MAS and the AV.

Example 4 includes the processor according to example 1 or 2, further configured to: retrieve, from the MAS, a reference correction value associated with a road segment where the AV is travelling; and determine an average value of the reference correction value and the real-time correction value as a final real-time correction value for the real-time localization.

Example 5 includes the processor according to example 4, wherein the reference correction value is a real-time correction value reported to the MAS by another AV passing the road segment.

Example 6 includes the processor according to example 4, wherein the reference correction value is an average value of a number M of real-time correction values reported respectively by a number M of AVs passing the road segment during a predetermined period of time, where M is an integer greater than 1.

Example 7 includes the processor according to example 4, further configured to: report the final real-time correction value to the MAS via a communication interface between the MAS and the AV.

Example 8 includes the processor according to any of examples 1 to 7, wherein the reference landmark comprises a road edge or a lane boundary stored and updated periodically in the MAS, and the ground truth landmark comprises a corresponding road edge or a corresponding lane boundary detected by the AV in real time according to the image data captured by the one or more image capture devices installed on the AV.

Example 9 includes an autonomous vehicle (AV), comprising the processor for real-time localization error correction according to any of examples 1 to 8 and the one or more image capture devices, wherein the AV is configured to interact with the map aggregating server (MAS) for the real-time localization based on the determined real-time correction value.

Example 10 includes a method for real-time localization error correction of an autonomous vehicle (AV), comprising: retrieving a reference landmark around the AV from a map aggregating server (MAS), wherein the AV is configured to interact with the MAS for real-time localization; detecting, in real time, a ground truth landmark corresponding to the reference landmark, according to image data captured by one or more image capture devices installed on the AV; and determining a deviation between the ground truth landmark and the reference landmark as a real-time correction value for the real-time localization of the AV.

Example 11 includes the method according to example 10, further comprising: retrieving a number N of reference landmarks around the AV from the MAS; detecting, in real time, a number N of ground truth landmarks respectively corresponding to the number N of reference landmarks; comparing each pair of reference landmark and corresponding ground truth landmark to obtain a number N of deviations between the number N of reference landmarks and the number N of corresponding ground truth landmarks; and determining an average value of the number N of deviations as the real-time correction value for the real-time localization of the AV, where N is an integer greater than 1.

Example 12 includes the method according to example 10 or 11, further comprising: reporting the real-time correction value to the MAS via a communication interface between the MAS and the AV.

Example 13 includes the method according to example 10 or 11, further comprising: retrieving, from the MAS, a reference correction value associated with a road segment where the AV is travelling; and determining an average value of the reference correction value and the real-time correction value as a final real-time correction value for the real-time localization.

Example 14 includes the method according to example 13, wherein the reference correction value is a real-time correction value reported to the MAS by another AV passing the road segment.

Example 15 includes the method according to example 13, wherein the reference correction value is an average value of a number M of real-time correction values reported respectively by a number M of AVs passing the road segment during a predetermined period of time, where M is an integer greater than 1.

Example 16 includes the method according to example 13, further comprising: reporting the final real-time correction value to the MAS via a communication interface between the MAS and the AV.

Example 17 includes the method according to any of examples 10 to 16, wherein the reference landmark comprises a road edge or a lane boundary stored and updated periodically in the MAS, and the ground truth landmark comprises a corresponding road edge or a corresponding lane boundary detected by the AV in real time according to the image data captured by the one or more image capture devices installed on the AV.

Example 18 includes a map aggregating server (MAS) to facilitate real-time localization of an autonomous vehicle (AV), configured to: store a database of reference landmarks; receive, from the AV, a real-time correction value for the real-time localization, wherein the real-time correction value is associated with a road segment where the AV is travelling, and a deviation between a ground truth landmark on the road segment detected by the AV in real time and a corresponding reference landmark retrieved by the AV from the MAS is determined by the AV and reported to the MAS as the real-time correction value; and determine the real-time correction value as a reference correction value for real-time localization of AVs travelling on the road segment.

Example 19 includes the MAS according to example 18, wherein the AV is configured to retrieve a number N of reference landmarks around the AV from the MAS; detect, in real time, a number N of ground truth landmarks respectively corresponding to the number N of reference landmarks; and compare each pair of reference landmark and corresponding ground truth landmark to obtain a number N of deviations between the number N of reference landmarks and the number N of corresponding ground truth landmarks, where N is an integer greater than 1, and wherein the real-time correction value is an average value of the number N of deviations.

Example 20 includes the MAS according to example 18 or 19, further configured to: receive a number M of real-time correction values respectively from a number M of AVs passing the road segment during a predetermined period of time, where M is an integer greater than 1; and determine an average value of the number M of real-time correction values as the reference correction value for real-time localization of the AVs travelling on the road segment.

Example 21 includes the MAS according to example 20, wherein the AV is further configured to retrieve the reference correction value from the MAS, determine an average value of the reference correction value and the real-time correction value as a final real-time correction value for the real-time localization, and report the final real-time correction value to the MAS.

Example 22 includes the MAS according to any of examples 18 to 21, wherein the reference landmark comprises a road edge or a lane boundary stored and updated periodically in the MAS, and the ground truth landmark comprises a corresponding road edge or a corresponding lane boundary detected by the AV in real time according to the image data captured by the one or more image capture devices installed on the AV.

Example 23 includes a computer-readable medium having instructions stored thereon, the instructions, when executed by a processor of an autonomous vehicle (AV), to cause the processor to perform the method for real-time localization error correction of the AV according to any of examples 10 to 17.

Example 24 includes an apparatus for real-time localization error correction of an autonomous vehicle (AV), comprising: means for retrieving a reference landmark around the AV from a map aggregating server (MAS), wherein the AV is configured to interact with the MAS for real-time localization; means for detecting, in real time, a ground truth landmark corresponding to the reference landmark, according to image data captured by one or more image capture devices installed on the AV; and means for determining a deviation between the ground truth landmark and the reference landmark as a real-time correction value for the real-time localization of the AV.

Example 25 includes the apparatus according to example 24, further comprising: means for retrieving a number N of reference landmarks around the AV from the MAS; means for detecting, in real time, a number N of ground truth landmarks respectively corresponding to the number N of reference landmarks; means for comparing each pair of reference landmark and corresponding ground truth landmark to obtain a number N of deviations between the number N of reference landmarks and the number N of corresponding ground truth landmarks; and means for determining an average value of the number N of deviations as the real-time correction value for the real-time localization of the AV, where N is an integer greater than 1.

Example 26 includes the apparatus according to example 24 or 25, further comprising: means for reporting the real-time correction value to the MAS via a communication interface between the MAS and the AV.

Example 27 includes the apparatus according to example 24 or 25, further comprising: means for retrieving, from the MAS, a reference correction value associated with a road segment where the AV is travelling; and means for determining an average value of the reference correction value and the real-time correction value as a final real-time correction value for the real-time localization.

Example 28 includes the apparatus according to example 27, wherein the reference correction value is a real-time correction value reported to the MAS by another AV passing the road segment.

Example 29 includes the apparatus according to example 27, wherein the reference correction value is an average value of a number M of real-time correction values reported respectively by a number M of AVs passing the road segment during a predetermined period of time, where M is an integer greater than 1.

Example 30 includes the apparatus according to example 27, further comprising: means for reporting the final real-time correction value to the MAS via a communication interface between the MAS and the AV.

Example 31 includes the apparatus according to any of examples 24 to 30, wherein the reference landmark comprises a road edge or a lane boundary stored and updated periodically in the MAS, and the ground truth landmark comprises a corresponding road edge or a corresponding lane boundary detected by the AV in real time according to the image data captured by the one or more image capture devices installed on the AV.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the appended claims and the equivalents thereof.

What is claimed is:

1. A processor for real-time localization error correction of an autonomous vehicle (AV), configured to:
   retrieve a reference landmark around the AV from a map aggregating server (MAS), wherein the AV is configured to interact with the MAS for real-time localization;
   detect, in real time, a ground truth landmark corresponding to the reference landmark, according to image data captured by one or more image capture devices installed on the AV;
   calculate a deviation between the ground truth landmark and the reference landmark as a real-time correction value for the real-time localization of the AV;
   retrieve, from the MAS, a reference correction value associated with a road segment where the AV is travelling;
   calculate an average value of the reference correction value and the real-time correction value as a final real-time correction value for the real-time localization;
   perform the real-time localization error correction of the AV based on the final real-time correction value; and
   cause the AV to autonomously drive to a destination based on the real-time localization of the AV after the real-time localization error correction.

2. The processor according to claim 1, further configured to:
   retrieve a number N of reference landmarks around the AV from the MAS;
   detect, in real time, a number N of ground truth landmarks respectively corresponding to the number N of reference landmarks;
   compare each pair of reference landmark and corresponding ground truth landmark to obtain a number N of deviations between the number N of reference landmarks and the number N of corresponding ground truth landmarks; and
   determine an average value of the number N of deviations as the real-time correction value for the real-time localization of the AV, where N is an integer greater than 1.

3. The processor according to claim 1, further configured to:
   report the real-time correction value to the MAS via a communication interface between the MAS and the AV.

4. The processor according to claim 1, wherein the reference correction value is a real-time correction value reported to the MAS by another AV passing the road segment.

5. The processor according to claim 1, wherein the reference correction value is an average value of a number M of real-time correction values reported respectively by a number M of AVs passing the road segment during a predetermined period of time, where M is an integer greater than 1.

6. The processor according to claim 1, further configured to:
   report the final real-time correction value to the MAS via a communication interface between the MAS and the AV.

7. The processor according to claim 1, wherein the reference landmark comprises a road edge or a lane boundary stored and updated periodically in the MAS, and the ground truth landmark comprises a corresponding road edge or a corresponding lane boundary detected by the AV in real time according to the image data captured by the one or more image capture devices installed on the AV.

8. An autonomous vehicle (AV), comprising a processor for real-time localization error correction of the AV, and one or more image capture devices, wherein
   the processor is configured to:
   retrieve a reference landmark around the AV from a map aggregating server (MAS), wherein the AV is configured to interact with the MAS for real-time localization;
   detect, in real time, a ground truth landmark corresponding to the reference landmark, according to image data captured by the one or more image capture devices;
   calculate a deviation between the ground truth landmark and the reference landmark as a real-time correction value for the real-time localization of the AV;
   retrieve, from the MAS, a reference correction value associated with a road segment where the AV is travelling;
   calculate an average value of the reference correction value and the real-time correction value as a final real-time correction value for the real-time localization;
   perform the real-time localization error correction of the AV based on the final real-time correction value; and
   cause the AV to autonomously drive to a destination based on the real-time localization of the AV after the real-time localization error correction.

9. A method for real-time localization error correction of an autonomous vehicle (AV), comprising:
   retrieving a reference landmark around the AV from a map aggregating server (MAS), wherein the AV is configured to interact with the MAS for real-time localization;
   detecting, in real time, a ground truth landmark corresponding to the reference landmark, according to image data captured by one or more image capture devices installed on the AV;

calculating a deviation between the ground truth landmark and the reference landmark as a real-time correction value for the real-time localization of the AV;

retrieving, from the MAS, a reference correction value associated with a road segment where the AV is travelling;

calculating an average value of the reference correction value and the real-time correction value as a final real-time correction value for the real-time localization;

performing the real-time localization error correction of the AV based on the final real-time correction value; and causing the AV to autonomously drive to a destination based on the real-time localization of the AV after the real-time localization error correction.

10. The method according to claim 9, further comprising:
retrieving a number N of reference landmarks around the AV from the MAS;

detecting, in real time, a number N of ground truth landmarks respectively corresponding to the number N of reference landmarks;

comparing each pair of reference landmark and corresponding ground truth landmark to obtain a number N of deviations between the number N of reference landmarks and the number N of corresponding ground truth landmarks; and determining an average value of the number N of deviations as the real-time correction value for the real-time localization of the AV, where N is an integer greater than 1.

11. The method according to claim 9, further comprising:
reporting the real-time correction value to the MAS via a communication interface between the MAS and the AV.

12. The method according to claim 9, wherein the reference correction value is a real-time correction value reported to the MAS by another AV passing the road segment.

13. The method according to claim 9, wherein the reference correction value is an average value of a number M of real-time correction values reported respectively by a number M of AVs passing the road segment during a predetermined period of time, where M is an integer greater than 1.

14. The method according to claim 9, further comprising:
reporting the final real-time correction value to the MAS via a communication interface between the MAS and the AV.

15. The method according to claim 9, wherein the reference landmark comprises a road edge or a lane boundary stored and updated periodically in the MAS, and the ground truth landmark comprises a corresponding road edge or a corresponding lane boundary detected by the AV in real time according to the image data captured by the one or more image capture devices installed on the AV.

16. A non-transitory computer-readable medium having instructions stored thereon, wherein the instructions, when executed by a processor, cause the processor to perform the method for the real-time localization error correction of the AV according to claim 9.

* * * * *